United States Patent [19]

Hall

[11] Patent Number: 5,043,875
[45] Date of Patent: Aug. 27, 1991

[54] COMMUNICATION SYSTEM WITH INFORMATION BEING EXCHANGED AMONG DIFFERENT PARTITIONS OF A SWITCHING FUNCTION AND SIMULTANEOUSLY BLOCKING SOME PARTITIONS FROM RECEIVING EXTERNAL STIMULI

[75] Inventor: Lawrence M. Hall, Hilversum, Netherlands

[73] Assignee: U.S. Philips Corporation, New York, N.Y.

[21] Appl. No.: 290,876

[22] Filed: Dec. 28, 1988

Related U.S. Application Data

[63] Continuation of Ser. No. 731,633, May 7, 1985, abandoned.

[30] Foreign Application Priority Data

May 7, 1984 [NL] Netherlands .................. 8401446

[51] Int. Cl.⁵ .......................................... G06F 15/00
[52] U.S. Cl. ................................ 364/200; 364/222.3; 364/238.1; 364/245.9; 370/68.1; 379/94
[58] Field of Search ... 364/200 MS File, 900 MS File; 370/68.1; 379/260, 280, 284, 94

[56] References Cited

U.S. PATENT DOCUMENTS

| | | | |
|---|---|---|---|
| 4,442,484 | 4/1984 | Childs, Jr. et al. | 364/200 |
| 4,530,051 | 7/1985 | Johnson et al. | 364/200 |
| 4,545,016 | 10/1985 | Berger | 364/200 |
| 4,590,583 | 5/1986 | Miller | 364/724 |
| 4,814,979 | 3/1989 | Neches | 364/200 |

Primary Examiner—Thomas C. Lee
Attorney, Agent, or Firm—Leroy Eason

[57] ABSTRACT

In data-communication systems, such as a public or a private telephone system, a data network or a computer communication network, it is often necessary to simultaneously establish a plurality of connections, maintaining or interrupting the same between terminals connected to the system. Apart from these communication control functions a plurality of further functions have to be carried out, such as data management, system protection and maintenance. All these functions are regarded as processes which are worked in common with other processes in parallel by the system. In order to avoid duplication of processing means and to restrict the complexity, operation in accordance with the invention is carried out so that at the beginning of the data (processing) in the central control a process is created which will carry out a function demanded, for example, by a terminal. Inside this process one or more partitions are created each for carrying out a part of the demanded function, while to each partition is allotted a local memory space which can only be used by the partition concerned. Between the partition associated with the same process an information channel is created. By arranging in one process interrelated or to be interrelated sysem partitions (in particular terminals), effective and economic data processing operation can be obtained.

2 Claims, 3 Drawing Sheets

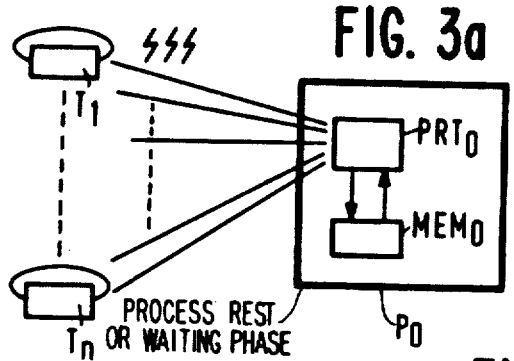
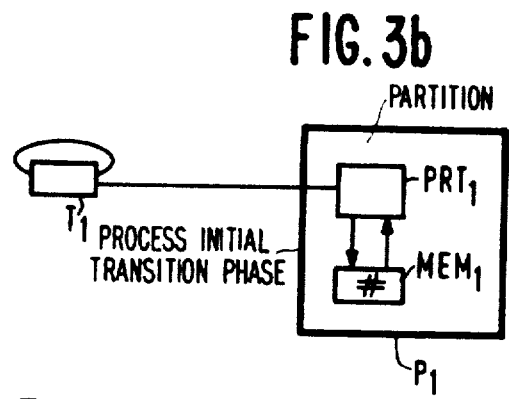
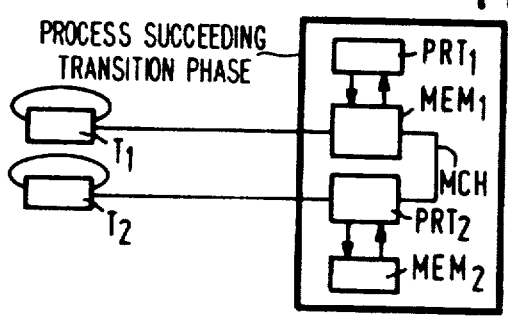
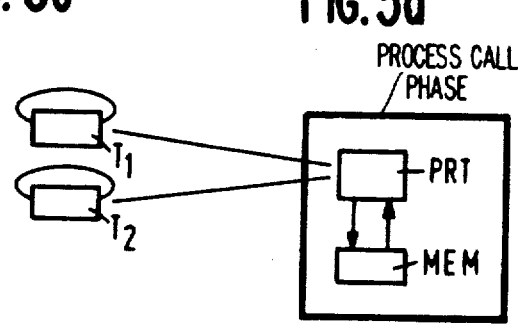
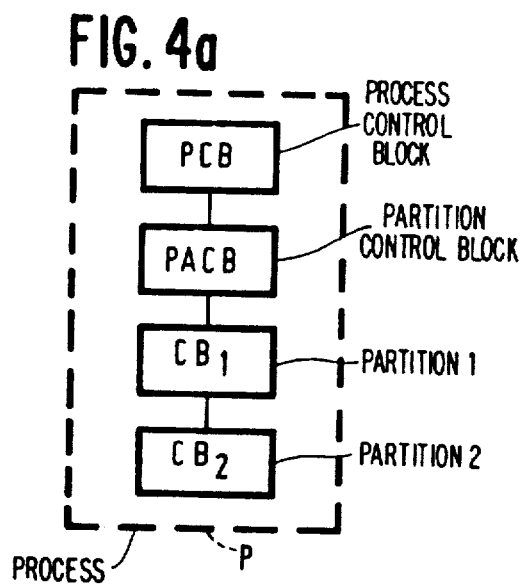
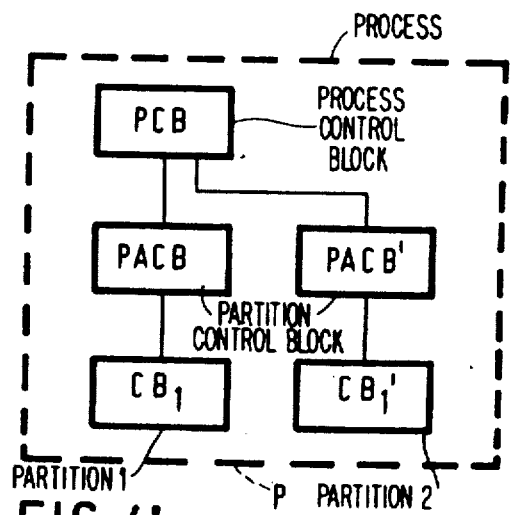
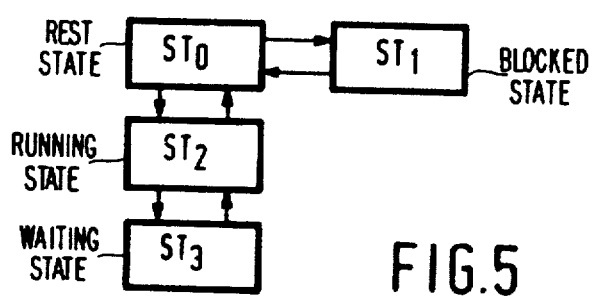

COMMUNICATION SYSTEM WITH INFORMATION BEING EXCHANGED AMONG DIFFERENT PARTITIONS OF A SWITCHING FUNCTION AND SIMULTANEOUSLY BLOCKING SOME PARTITIONS FROM RECEIVING EXTERNAL STIMULI

BACKGROUND OF THE INVENTION

1. Field of the Invention

The invention relates to a method and apparatus for controlling a data communication system comprising a plurality of terminals connected to a central control.

2. Description of the Related Art

Such a system is found in many forms, for example, public or private telephone systems, computer communication network, data network and so on. Characteristic of all these systems is that a connection has to be built up, maintained and disrupted between terminals connected to the system. A terminal may be a telephone set, a data unit, a visual display unit and so on. In order to describe the problems which may occur in such systems, they will be set out in detail with reference to a telephone system.

A telephone system, particularly viewed on the side of its user, deals with calls which require establishing, maintaining and disrupting connections between terminals of the system. Any call can be regarded as a process, and because a plurality of calls can occur simultaneously in the system, many processes are simultaneously carried out in parallel.

In principle the processes can be carried out by the central control in two ways (see, for example, M. T. Hills and S. Kano, Programming Electronic Switching Systems, P. Peregrinus Ltd. Sevennage, Eng., in particular, Paragraph 2.2-2.4). The first way of processing is based on carrying out each of the calls as a whole. Because a call involves a number of terminals, each of which may be in a number of states, a system based on processing all calls individually is complicated by duplication (in some cases multi-duplication) of processing means. In many of the different states of a terminal the same function may be demanded, for example, numbers may be expected in the "off hook" state and also in the called state. In both cases these functions require independent means (coding) giving rise to extra memory space and to an extra source of errors. The second way of processing is based on terminal processing, in which the terminal processes forming part of the same call are interrelated in some manner. The drawback of this manner of processing is that, because the terminal processes are dealt with in parallel, more than one terminal process are worked in one and the same process, which increases the complexity (for example, by "crossing messages").

SUMMARY OF THE INVENTION

The invention has for its object to provide a method and apparatus for controlling a data-communication system in which duplication of processing means and complexity is reduced. According to the invention the method of controlling a data-communication system of the kind set forth in the preamble is characterized in that it comprises the following steps:

(1) at the beginning of the data processing, in the central control a process is formulated to perform the function demanded by, for example, a terminal, (2) in said process one or more partitions are created each of which is for performing an individual part of the demanded function, to each partition being allotted a local memory space which can only be used by the partition concerned, whilst an information channel is created between the partitions associated with the same process, (3) a stimulus for the process is supplied to that partition which is designed for carrying out that stimulus, (4) during the processing of the stimulus mentioned in step 3 information (stimuli) can be exchanged between the carrying-out partition and the further partitions associated with other parts of the same process and/or between the carrying-out partition and the remainder of the system, (5) all further partitions which may form part of the same process are blocked for stimuli other than those of step 4 until the processing of the stimulus mentioned in step 3 has finished, (6) in the absence of any stimulus all partitions of a process remain available for stimuli.

According to the invention a data-communication system of the kind set forth in the preamble is characterized in that the system comprises:

means for programming the central control at the beginning of the data-processing for performing the required function, means for creating one or more partitions within said program for performing individual parts of the required function, local memory space allotted for each partition and only usable for the corresponding part of the required function, an information channel between the partitions of the same process, means for supplying a stimulus to that partition of a process designed for dealing with that stimulus, means for blocking all further partitions associated with a process during the performing of a stimulus by one of the partitions, means for unblocking the blocked partitions associated with a process after the final performance of a stimulus.

BRIEF DESCRIPTION OF THE DRAWINGS

The invention and its advantages will be described more fully hereinafter with reference to the accompanying drawings, in which:

FIG. 5 is a diagram of states of a partition within a process in accordance with the invention.

DESCRIPTION OF THE PREFERRED EMBODIMENTS

A data-communication system comprises in general a plurality of terminals connected to a central control. Examples of such systems are: a telephone system, a facsimile system, a computer network, and so on. In principle, the invention can be applied to anyone of such systems. By way of example, the invention will be described with reference to the application thereof to a private telephone system. The invention is, however, in no way limited thereto.

Figure 1:
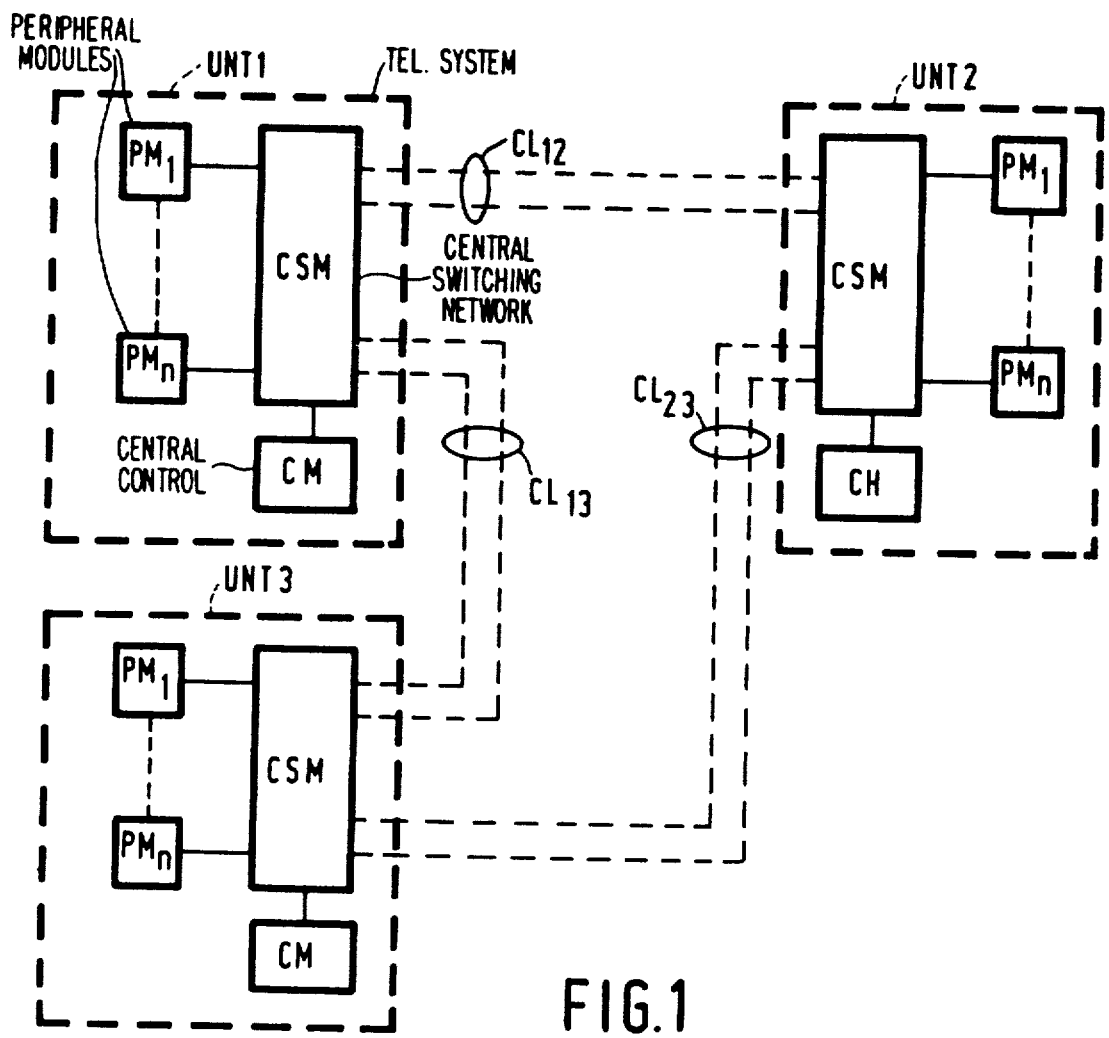
FIG. 1 is a block diagram of a telephone system.

FIG. 1 shows three interconnected telephone systems $UNT_1$, $UNT_2$ and $UNT_3$. Each system comprises a plurality of peripheral modules $PM_1, \ldots PM_n$, connected to a central switching network CSM. The central control CM of the telephone system is coupled with the central switching network CSM for controlling the same and the peripheral modules. The telephone systems $UNT_1$, $UNT_2$ and $UNT_3$ are interconnected by communication connections $CL_{12}$, $CL_{23}$, $CL_{13}$. The present invention can be applied to the telephone system shown in FIG. 1, and also to systems including more telephone systems or fewer telephone systems and in particular the invention can be applied to a single telephone system.

Figure 2:
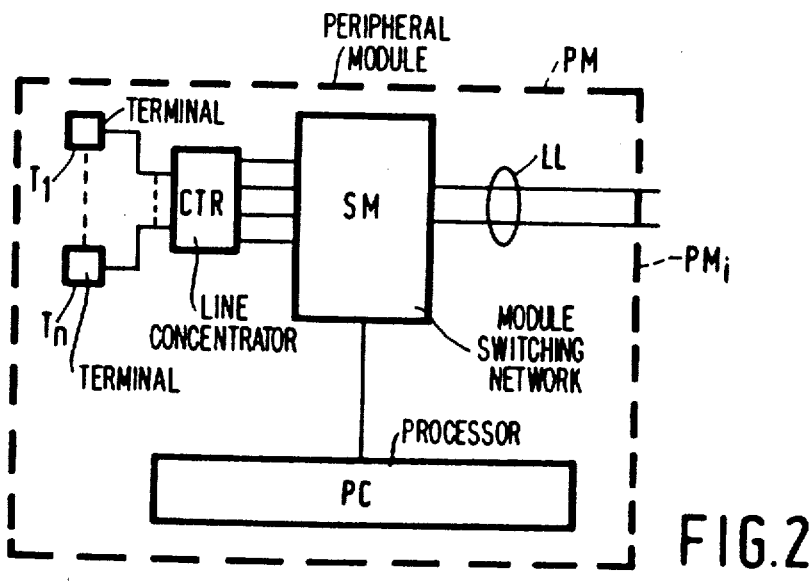
FIG. 2 is a block diagram of a peripheral module for use in a system as shown in FIG. 1, FIGS. 3a, 3b, 3c and 3d together show a way of carrying out the method embodying the invention, FIGS. 4a and 4b together is a block diagram illustrating the creation of an additional partition in accordance with the invention.

The peripheral module PM shown in FIG. 2 comprises a peripheral switching network SM and a processor PC connected thereto. The peripheral module furthermore comprises a plurality of terminals $T_1, \ldots T_n$ connected—for example through a line concentrator CTR—to the peripheral switching network SM. The output side of the peripheral switching network SM is connected through a connection LL to the central switching network CSM. It is noted that the terminals may be connected in a different way, for example, directly to the central control CM (FIG. 1). The peripheral processor PC has a number of tasks such as the recognition of external stimuli (for example, picking up the receiver from a set), the "translation" of the external stimuli into internal stimuli (information for the central control and vice versa), the control of the peripheral switching network and the tone control.

In a telephone system a plurality of functions have to be performed such as a call control, data management, system assurance and operational maintenance. All these functions may be considered to be processes worked in parallel with other processes by the system. It is not only necessary to perform several functions in parallel, but some functions have to be accomplished several times (for example, it may be necessary to simultaneously work more than one call). To each function is given a number (PIV number) which enables unambiguous identification of that function. All processes having the same functions are built up in the same way. Only the data on which they work are different (for example, number analysis, or number of a specific subscriber, etc.)

A process is defined to be in a stable state when it is not operating and when no stimuli are offered to perform the process. When a stimulus is offered, the process carries out the actions it can perform from the stable state it occupied. After the performance of the actions the process returns into the stable state, which may possibly be different from the stable state it occupied before. The whole sequence of actions during a transition may be waiting a stimulus, for example, the reaction to a generated stimulus. Such a situation seems to be a stable state because the process does not carry out any work; the process only waits a stimulus. The difference from a stable state is, therefore, that during the waiting time the transition has not yet been completed.

With reference to the example shown in FIG. 3 the method will be set out further for a call control process. In the rest phase (FIG. 3a) the terminals $T_1, \ldots T_n$ are, so to say, coupled with the process $P_o$. This process thus controls all terminals in the rest phase. When at the terminal $T_1$ the receiver is lifted from the cradle, this generates an external stimulus which is converted by the processor PC (FIG. 2) of the module with which the terminal $T_1$ is associated into an internal stimulus (information) for central control CM and after the reception of this stimulus by central control CM a new process $P_1$ is created (FIG. 3b). The terminals $T_2 \ldots T_n$ continue forming part of the process $P_o$. In the process a partition $PRT_1$ is created. In addition, the partition $PRT_1$ is allotted a local memory space $MEM_1$, which can only be used by partition $PRT_1$. The partition $PRT_1$ and the associated memory space $MEM_1$ then form the individualized part of the process formulated by central control CM (FIG. 1) which is allotted to the terminal $T_1$. Stimuli from or to terminal $T_1$ are worked or given off by partition $PRT_1$ or $MEM_1$.

When a next stimulus from terminal $T_1$ shows that a call with a further terminal ($T_2$) is desired, a second partition $PRT_2$ (FIG. 3c) is formed within the process and also obtains a local memory space $MEM_2$. At the same time terminal $T_2$ is removed from process $P_o$. The partition $PRT_2$ constitutes the part of the process created by central control CM (FIG. 1) which is allotted to terminal $T_2$. Stimuli from or to terminal $T_2$ are worked or given off by $PRT_2/MEM_2$. Between the two partitions of the process an information channel MCH is created.

Consequently in this system the stimuli are not directed to the complete process but always to one of its partitions (if the process has only one partition, this difference is unimportant).

As stated above, a partition is normally in the stable state. Only after it is reached by a stimulus is a transition started, during which a number of actions are carried out and which ends in a (new) stable state.

Only one partition associated with a process can be in transition at any time. When a stimulus is received by a partition of a process, all partitions of which were stable, all further partitions are blocked until the partition receiving the stimulus is again in a stable state. In this manner items of information (stimuli) are prevented from crossing themselves. Table 1 shows which situations can occur with respect to the partitions $PRT_1$ and $PRT_2$ in the process, and their availability for stimuli emanating from other partitions.

TABLE I

| Partitions | | | Partition Available |
|---|---|---|---|
| $PRT_1$ (A) | $PRT_2$ (B) | Process | For Stimulus (information) |
| stable | stable | stable | A, B |
| running | stable | running | — |
| stable | running | running | — |
| waiting | stable | waiting | A |
| stable | waiting | waiting | B |

An exception to the rule that only one partition of a process may be in transition can be made in the case in which during the performance of a stimulus by a partition it has to wait for another stimulus, for example, because a reaction has to be received to a "demand" from the partition. In such a case it can be arranged that the partition informs the operating system of the central control CM, so the waiting time could be used for a stimulus for one of the other partitions associated with a different process.

In the call phase (FIG. 3d) the partitions PRT₁ and PRT₂ and the associated memory spaces MEM₁ and MEM₂ are joined because stimuli in this phase can only relate to the call as a whole. Duplication of functions is thus avoided. If, however, during the call phase one of the subscribers wants some consultation with another terminal, such an action leads to the creation of a new partition for the terminal T₃ which is consulted.

Stimuli (items of information) are exchanged between partitions, passed from terminal to partitions and from partitions to terminals under the control of the operating system of the central control CM. To each stimulus (information) some priority can be allotted so that, for example, a higher-priority information is worked earlier by the operating system than a lower-priority information. The partitions inside one process communicate with one another through the information channel in which, as stated above, crossing items of information are excluded. An information from one partition of a process to the other will, therefore, only worked after the first partition has become stable.

At the end of the call the process is destructed and the terminals concerned are set back into the rest phase (FIG. 3a).

As stated above, one or more partitions can be created in a process and be designed for carrying out a partial function of such process. FIG. 4 illustrates the creation of one additional partition. FIG. 4a shows the starting position. The process P comprises a process control block PCB containing the data specific of the process. For example, there are data about the partitions forming parts of the process, giving the partition identification (PIV number). Furthermore the process comprises a partition control block PACB indicated hierarchically arranged under the process control block. In this block are stored the partition specific data, for example, the state of the partition (stable, waiting, running), data about the further partitions of the process and about neighboring partitions and so on. The blocks CB₁ and CB₂ indicate finally the memory space reserved for the partitions (in this example two parts) and available only to the partition concerned, the memory space containing the application data.

FIG. 4b shows the state after a new, independent partition is created inside the process P. This is done by creating a new partition control block PACB'; and the allotment of one of the control blocks to said partition. In this example the partition block CB₂ is allotted to partition control block PACB'. Because this partition is the only one of the partitions in control block PACB' it is indicated by CB'₁. In creating a new partition there is also specified the state in which the new partition will be. Between the independent partitions PACB and PACB' is furthermore created an information channel A for the communication between the two partitions.

The elimination of a partition or the combination of two partitions into one are carried out in the manner opposite to that described above for creating an extra partition.

FIG. 5 shows the change of state diagram of a partition from the rest position $ST_o$ to $ST_1$ in a blocked state, from which state $ST_1$ it can again come into the stable state $ST_o$. On the other side the partition can be brought from the rest position $ST_o$ into the "running" state $ST_2$, when a stimulus is worked, whilst after this working it can get back into the stable state $ST_o$. During the "running" state $ST_2$ the partition may require given information from a further partition outside of the process and may have to wait the demanded information. In this case the process is brought from the state ("running") $ST_o$ into the state waiting $ST_3$. After the reception of the information concerned the partition is brought back into the "running" state $ST_2$ into the state waiting $ST_3$. After the reception of the information concerned the partition is brought back into the "running" state $ST_2$ and continues working. As stated above, only one partition inside a process can be in state $ST_2$ or state $ST_3$. All other partitions are then in state $ST_1$.

Figure 6:
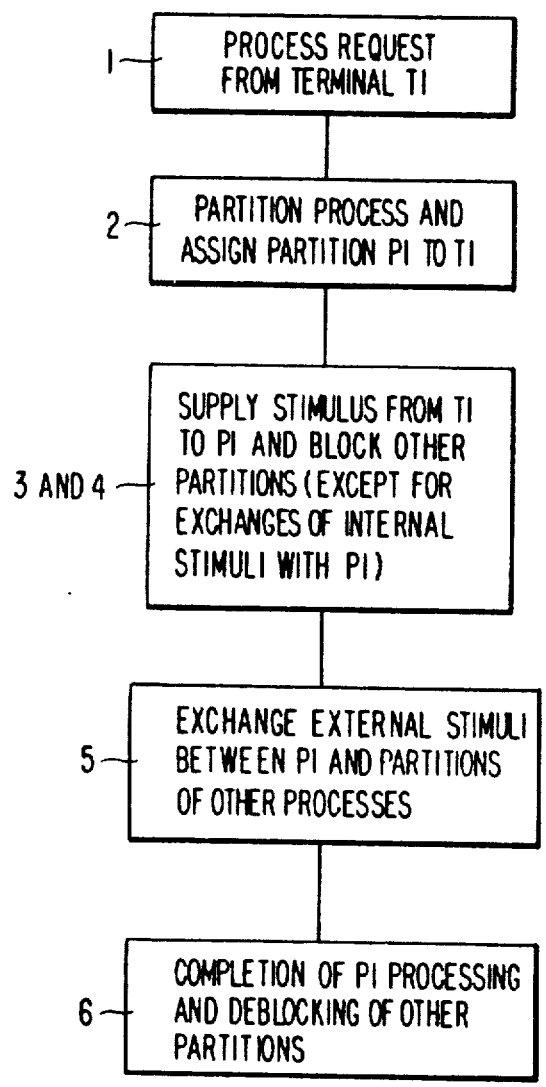
FIG. 6 is a flowchart of a switching control process in accordance with the invention.

As described above, all processes and the partitioning thereof are in accordance with the operating program of central control CM, which also stores the addresses (PIV numbers) of all terminals and process partitions. A flow chart of the method as described above is shown in FIG. 6. The blocks therein signify:

1) Request by a terminal (e.g. terminal $T_1$ going off-hook) informing central control CM of a process to be performed (e.g. initiate a call);

2) Central control CM partitions the process and assigns partition $P_1$ to process stimuli to or from terminal $T_1$;

3) External stimulus (e.g. a dialed digit) generated by terminal $T_1$ is routed by central control CM to partition $P_1$, and while partition $P_1$ is running central control CM blocks all other partitions of the same process;

4) Internal stimuli (between partitions of the same process) can be exchanged through channels between the running partition $P_1$ and other partitions (e.g. partitions assigned to other terminals) of the same process;

5) External stimuli (between partitions of different processes) can be exchanged through channels between the running partition $P_1$ and such other process partitions; and 6) Completion of processing by running partition $P_1$, and de-blocking of the blocked partitions.

What is claimed is:

1. An improved method of operating of a data communication system comprising a plurality of terminals, a central switching network for establishing interconnections between said terminals, and a central control responsive to stimuli received from said terminals to control the central switching network to perform switching functions signified by said stimuli, said improved method consisting of performance by the central control of the following steps in response to a stimulus received from any of said terminals:

(a) formulating a control process for controlling the central switching network to perform the switching function signified by an initial received stimulus;

(b) partitioning said control process into distinct partitions of said switching function and storing information constituted by each said partition in a local memory in a location therein allocated solely to said partition, and establishing channels for exchanging the information between said partitions associated with said switching function;

(c) applying a succeeding received stimulus to the partition containing the information relating to said succeeding stimulus, and processing the information in said partition in accordance with said stimulus so as to control the central switching network to perform the partition of said switching function;

(d) during step (c), exchanging the information between the partition being processed and other partitions associated with said switching function.

while blocking said other partitions from receiving other stimuli received from said terminals;

(e) unblocking all other of said partitions after step (c) has been completed and until a further stimulus is received; and (f) repeating steps (c), (d) and (e) for each further received stimulus relating to said switching function.

2. In a data communication system comprising a plurality of terminals, a central switching network for establishing interconnections between said terminals, and a central control responsive to a stimulus received from said terminals to control the switching network to perform switching functions signified by said stimuli; the improvement characterized in that said central control comprises:

(a) means responsive to an initial stimulus received from any of said terminals to formulate a control process for controlling said switching network to perform the switching function signified by said initial stimulus;

means for partitioning said control process into distinct partitions of said switching function and for storing information constituted by each said partition in a memory in a location therein allocated solely to said partition, said partitioning means also establishing channels for exchanging the information between said partitions associated with said switching function;

(c) means for applying a succeeding received stimulus to the partition containing the information relating to said succeeding stimulus, thereby enabling the central control to process said information in accordance with said succeeding stimulus so as to control the central switching network to perform the partition of said switching function;

(d) means for blocking all other partitions associated with said switching function during processing of the information in the partition to which said succeeding stimulus relates; and (e) means for unblocking all of said other partitions associated with said switching function after completion of processing of the information in the partition to which said succeeding stimulus relates.

* * * * *